(12) United States Patent
Ustach et al.

(10) Patent No.: US 10,813,455 B2
(45) Date of Patent: Oct. 27, 2020

(54) BUMPER ASSEMBLY

(71) Applicant: McCue Corporation, Peabody, MA (US)

(72) Inventors: Thomas Ustach, Revere, MA (US); David S. McCue, Manchester, MA (US); Amanda Gene Meltzer, Medford, MA (US)

(73) Assignee: McCue Corporation, Peabody, MA (US)

( * ) Notice: Subject to any disclaimer, the term of this patent is extended or adjusted under 35 U.S.C. 154(b) by 1019 days.

(21) Appl. No.: 14/573,204

(22) Filed: Dec. 17, 2014

(65) Prior Publication Data
US 2016/0174709 A1    Jun. 23, 2016

(51) Int. Cl.
*A47B 95/04* (2006.01)
*E04F 19/02* (2006.01)
*F16B 5/12* (2006.01)

(52) U.S. Cl.
CPC .......... *A47B 95/043* (2013.01); *E04F 19/026* (2013.01); *F16B 5/128* (2013.01); *A47B 2095/046* (2013.01)

(58) Field of Classification Search
CPC ....... E04F 19/02; E04F 19/026; E04F 19/028; E04F 17/08; A47B 95/043; A47B 2095/046; F16B 5/128
USPC ........... 248/345.1; 52/716.1, 717.05, 717.06, 52/718.01, 718.04, 718.06, 718.03
See application file for complete search history.

(56) References Cited

U.S. PATENT DOCUMENTS

| | | | | |
|---|---|---|---|---|
| 2,297,887 A * | 10/1942 | Hall | ................... | B60R 13/04 52/718.04 |
| 3,856,194 A * | 12/1974 | Helm | ................... | F16B 5/126 224/326 |
| 3,991,537 A * | 11/1976 | Brown | ................... | E04F 19/026 52/718.05 |
| 4,066,285 A * | 1/1978 | Hall | ................... | B60R 13/04 280/770 |
| 4,083,592 A * | 4/1978 | Rubin | ................... | B60R 13/04 428/31 |
| 4,286,630 A * | 9/1981 | Happer | ................... | F16L 3/26 138/116 |

(Continued)

FOREIGN PATENT DOCUMENTS

WO   WO-9101417 A1 *  2/1991  ........... A47B 13/083
WO   WO-2014145783 A1 *  9/2014  ................ F16L 3/26

*Primary Examiner* — Ryan D Kwiecinski
(74) *Attorney, Agent, or Firm* — Occhiuti & Rohlicek LLP

(57) ABSTRACT

A bumper assembly includes an elongate rigid shell formed of a metallic material and an elongate base. The elongate rigid shell includes an inner surface, an outer surface, a first shell edge, and a first flange protruding from the first shell edge in a direction toward the inner surface of the elongate rigid shell. The elongate base includes a base body including a first base edge and a first flexible latching element extending from the first base edge of the base body, the first flexible latching element including a first latching protrusion having a first inclined outer surface and a first shoulder. The elongate base is configured for insertion into the elongate rigid shell with the first flange compressing the first flexible latching element and engaging the first shoulder of the first latching protrusion.

26 Claims, 10 Drawing Sheets

(56) References Cited

U.S. PATENT DOCUMENTS

| | | | | |
|---|---|---|---|---|
| 5,096,753 | A * | 3/1992 | McCue | A47B 95/043 |
| | | | | 24/293 |
| 5,134,250 | A * | 7/1992 | Caveney | H02G 3/0418 |
| | | | | 138/162 |
| 5,149,569 | A * | 9/1992 | McCue | A47B 95/043 |
| | | | | 24/297 |
| 5,326,187 | A * | 7/1994 | St. Marie | E04F 11/1836 |
| | | | | 256/66 |
| 5,406,762 | A * | 4/1995 | Buard | H02G 3/0418 |
| | | | | 174/504 |
| 6,385,939 | B1 * | 5/2002 | Stout | G09F 15/0025 |
| | | | | 52/222 |
| 6,479,747 | B2 * | 11/2002 | Bellanger | H02G 3/0608 |
| | | | | 174/50 |
| 6,748,716 | B1 * | 6/2004 | Peck, Jr. | E04F 19/026 |
| | | | | 293/136 |
| 7,380,381 | B2 * | 6/2008 | Honda | E04F 19/02 |
| | | | | 52/290 |
| 2005/0005565 | A1 * | 1/2005 | McSharry | E04F 19/026 |
| | | | | 52/716.5 |
| 2005/0095413 | A1 * | 5/2005 | Wallace | B32B 7/02 |
| | | | | 428/217 |
| 2014/0260069 | A1 * | 9/2014 | Coon | F16L 3/26 |
| | | | | 52/716.1 |

* cited by examiner

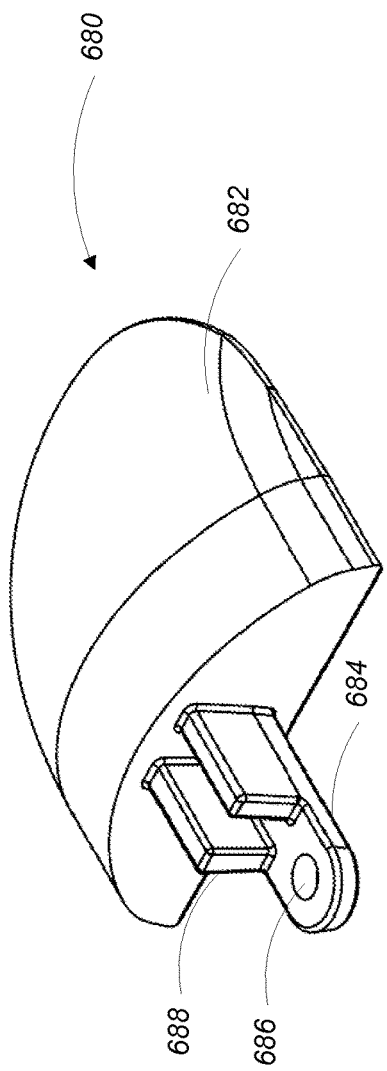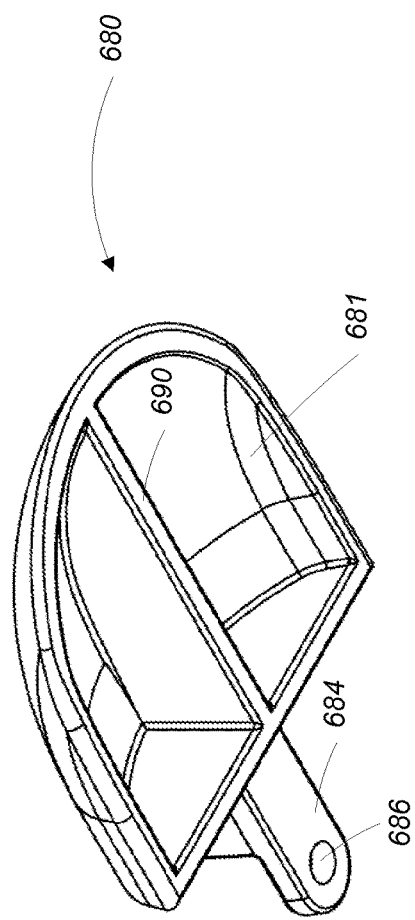

BUMPER ASSEMBLY

BACKGROUND

This invention relates to a bumper assembly.

In commercial environments such as retail stores, goods are often stored and displayed in product storage fixtures such as display cases, shelving, and refrigeration units. Generally, product storage fixtures in a store are arranged to form aisles through which customers, along with their shopping baskets and carts, pass as they shop. As the customers, their shopping baskets and carts pass through the aisles, they often bump into or rub against the product storage fixtures, potentially causing damage to the product storage fixtures.

To mitigate damage to product storage fixtures, bumpers are often installed on or near the exterior surfaces of product storage fixtures. Such bumpers prevent damage to the product storage fixtures by deflecting and/or absorbing the force of impact by objects such as shopping carts, shopping baskets, and customers.

SUMMARY

In a general aspect, a bumper assembly includes an elongate rigid shell formed of a metallic material and an elongate base. The elongate rigid shell includes an inner surface, an outer surface, a first shell edge, and a first flange protruding from the first shell edge in a direction toward the inner surface of the elongate rigid shell. The elongate base includes a base body including a first base edge and a first flexible latching element extending from the first base edge of the base body, the first flexible latching element including a first latching protrusion having a first inclined outer surface and a first shoulder. The elongate base is configured for insertion into the elongate rigid shell with the first flange compressing the first flexible latching element and engaging the first shoulder of the first latching protrusion.

Aspects may include one or more of the following features.

The elongate base may include a number of support members extending from the base body, each support member having a proximal end attached to the base body and a distal end configured to lie adjacent to the elongate rigid shell when the elongate base is inserted into the elongate rigid shell. Each support member of the number of support members may include a contact portion at its distal end, the contact portion having a thickness greater than a thickness of other portions of the support member. The first flexible latching element may include a first portion extending from the base body and a cantilever portion extending from the first portion, wherein the shoulder and the latching protrusion are disposed on the cantilever portion.

A thickness of the flexible latching element at a point on the flexible latching element where the first portion and the cantilever portion connect may be reduced to increase a flexibility of the flexible latching element. The outer surface of the elongate rigid shell may have a substantially semi-cylindrical shape. A cross section of the outer surface of the elongate rigid shell may have a substantially trapezoidal shape. A cross section of the outer surface of the elongate rigid shell may have a substantially rectangular shape. The elongate rigid shell may be made of stainless steel.

The elongate rigid shell may include a second shell edge, and a second flange protruding from the second shell edge in a direction toward the inner surface of the elongate rigid shell. The elongate base may further include a second base edge, and a second flexible latching element extending from the second base edge of the base body, the second flexible latching element including a second latching protrusion having a second inclined outer surface and a second shoulder. The elongate base may be further configured for insertion into the elongate rigid shell with the second flange compressing the second flexible latching element and engaging the second shoulder of the second latching protrusion.

The bumper assembly may include an end cap configured to engage an end of the elongate base. The end cap may include a hollow portion and a fastening protrusion for insertion into the elongate base and attachment to the elongate base. The hollow portion may have a rounded shape. The hollow portion may be substantially wedge-shaped. The hollow portion may include one or more reinforcing ribs. The hollow portion may be configured to abut the end of the elongate base. The end cap may also include a receiving portion configured to receive a portion of the end of the elongate base. The end may be formed of a metallic material. The end cap may be formed of a plastic material. The end cap may be formed of both a metallic material and a plastic material.

In some examples, the bumpers that are installed on exterior surfaces of product storage fixtures are made of a flexible plastic material. The flexible plastic material has the advantage of absorbing forces of impact from objects such as shopping carts, shopping baskets, and customers without breaking or becoming permanently deformed. However, flexible plastic materials are generally susceptible to sustaining unsightly abrasions when they are hit by an object. Furthermore, the flexible plastic materials suffer from problems such as shrinkage over time due to temperature, material degradation over time, and customer concerns that the plastic material may include dangerous materials (e.g., bisphenol-A).

In other examples, bumpers are made from a metallic material such as stainless steel. Bumpers made from metallic materials are unlikely to break or sustain abrasions when hit by an object. However, they are susceptible becoming dented or otherwise permanently deformed when hit by an object. Furthermore, installation of conventional metallic bumpers may entail a highly customized process including bending, cutting, and welding metallic bumper material.

Furthermore, both conventional plastic bumpers and conventional metallic bumpers can be difficult to install in a cosmetically pleasing manner. For example, some bumpers need to be attached to the outer surface of a product storage fixture from the front side of the bumper, resulting screws (or other fasteners) being visible to customers. Visible screws are unsightly, cause dangerous catching points for customer's skin and clothing, and tend to collect dirt and bacteria. Other bumpers need to be attached from behind the outer surface of the product storage fixture. While attaching the bumper from behind may result in fasteners being hidden from the customer's view, it can be difficult to access the area behind the outer surface of the product storage fixture, making the process of installing the bumper difficult. In some examples, once a fixture has left the manufacturer, it is impossible to install bumpers from the inside of the fixture without damaging the fixture.

The aspects described herein relate to bumper assemblies that address all of the disadvantages described above Aspects may include one or more of the following advantages.

Among other advantages, unlike conventional bumper assemblies, aspects are both abrasion resistant and deformation resistant.

Aspects have a simpler installation procedure as compared to some conventional bumpers due to the two piece bumper assembly.

Aspects are more aesthetically pleasing than some conventional bumpers due to the two-piece bumper assembly.

Aspects include end caps that are configured to receive a portion of an end of the elongate base, resulting in a tightly integrated bumper assembly.

Other features and advantages of the invention are apparent from the following description, and from the claims.

DESCRIPTION OF DRAWINGS

FIG. 6 is a top perspective view of a rounded end cap.

FIG. 7 is a bottom perspective view of the rounded end cap of FIG. 6.

DESCRIPTION

1 Semi-Cylindrical Stainless Steel Bumper

Figure 1:
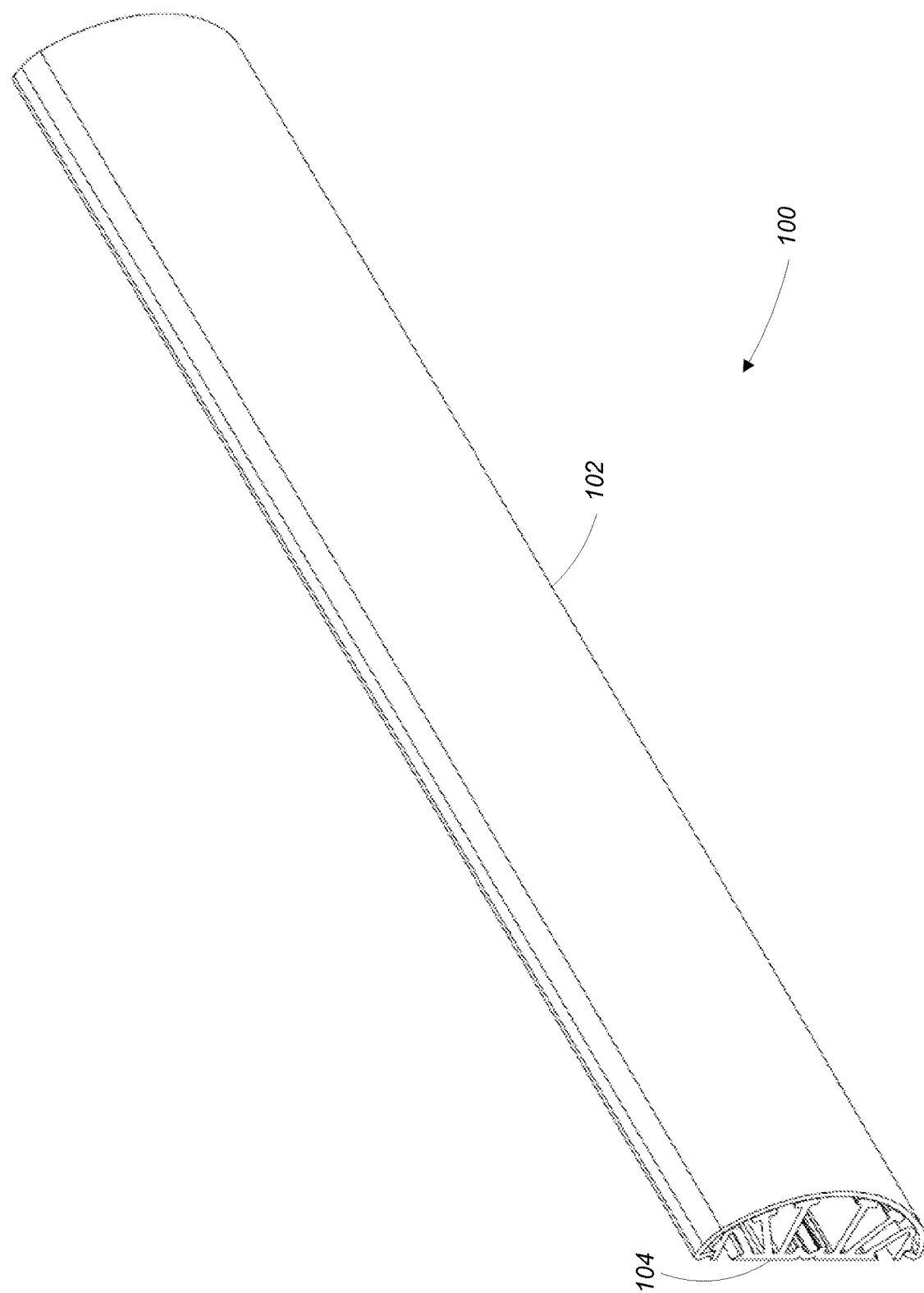
FIG. 1 is a perspective view of a semi-cylindrical bumper assembly.

Referring to FIG. 1, a semi-cylindrical stainless steel bumper assembly 100 includes an elongate rigid shell 102 and an elongate base 104. In FIG. 1, the bumper assembly 100 is shown in its assembled state, with the elongate base 104 inserted into the elongate rigid shell 102. The elongate rigid shell 102 is made of a rigid material such as stainless steel or another rigid metal and the elongate base 104 is made of a flexible material such as plastic.

As is described in greater detail below, the elongate rigid shell 102 and the elongate base 104 are designed together to ensure that the bumper assembly is easily installed and is resistant to sustaining damage such as deformation (e.g., denting) and abrading of the elongate rigid shell 102. Very generally, the bumper assembly 100 is abrasion resistant due to the stainless steel material of the elongate rigid shell 102 and is deformation resistant due to the shape of the elongate base 104, which acts as a support structure for the elongate rigid shell 102. Furthermore, the bumper assembly 100 has a simplified installation process (as is described in greater detail below) due to the elongate base 104 and the rigid elongate shell 102 being formed as two separate parts.

Figure 2:
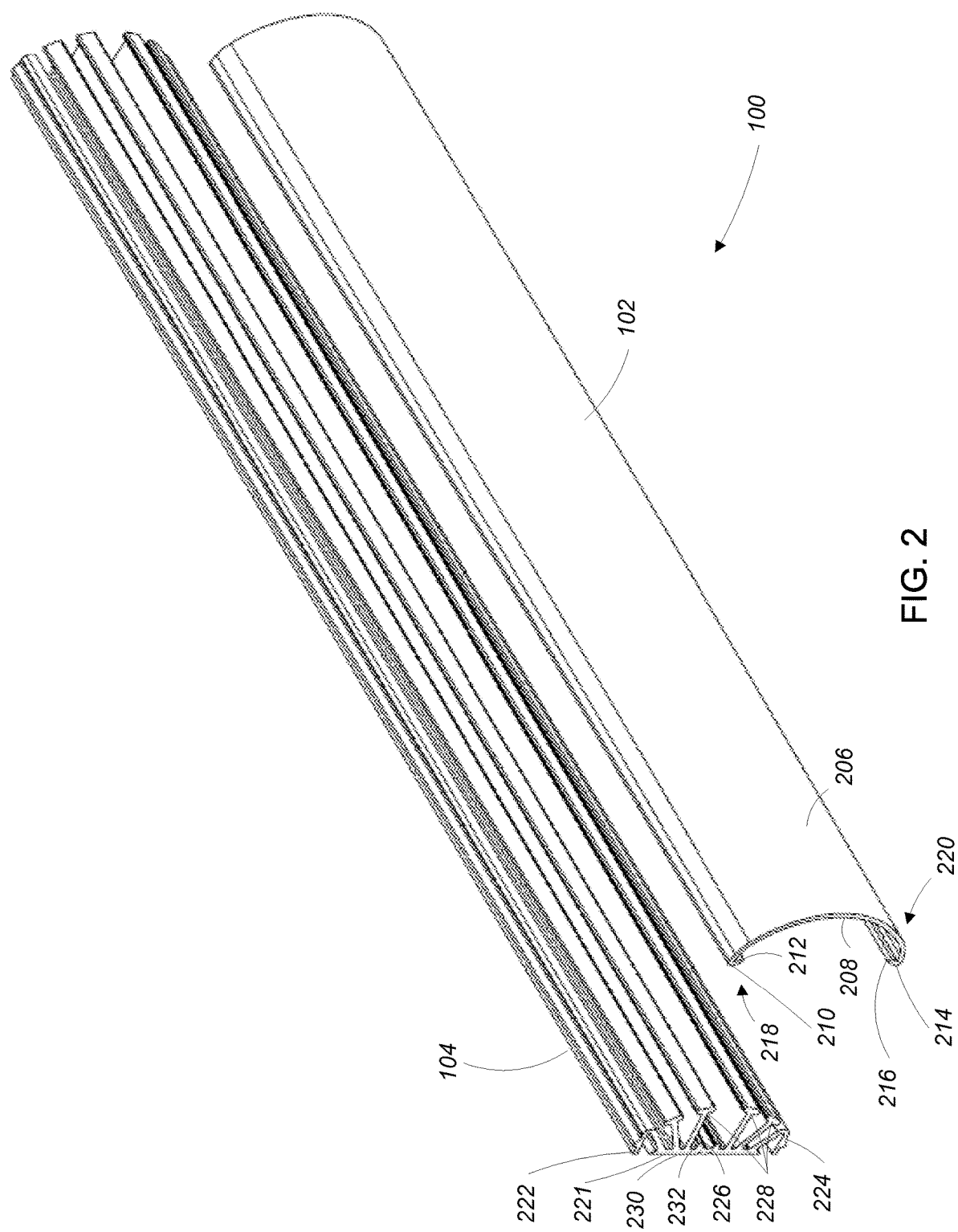
FIG. 2 is an exploded view of the semi-cylindrical bumper assembly of FIG. 1.

Referring to FIG. 2, an exploded view of the bumper assembly 100 shows the elongate rigid shell 102 and the elongate base 104 in a disassembled state. The elongate rigid shell 102 is a hollow, semi-cylindrical member including an outer surface 206, an inner surface 208, a first edge 210, a first flange 212, a second edge 214, and a second flange 216. The outer surface 206 of the elongate rigid shell 102 faces away from the elongate base 104 and serves as the surface of the elongate rigid shell 102 that receives the force of impact of objects that hit the bumper assembly 100. The inner surface 208 of the elongate rigid shell 102 faces the elongate base 104.

The first edge 210 runs along a length of a first side 218 of the elongate rigid shell 102. The first flange 212 runs along the length of the elongate rigid shell 102 and extends from the first edge 210 toward the inner surface 208 of the elongate rigid shell 102. The second edge 214 runs along a length of a second side 220 (opposite the first side 218) of the elongate rigid shell 102. The second flange 216 runs along the length of the elongate rigid shell 102 and extends from the second edge 214 toward the inner surface 208 of the elongate rigid shell 102.

As described in greater detail below, the elongate base 104 includes a base body 221 having a first side 230 which lies flush with a surface when the elongate base 104 is installed. The base body 221 has a second side 232 facing away from the first side 230 and including a number of elements including an attachment portion 226, support members 228, a first latching element 222, and a second latching element 224, each of which extends along a length of the elongate base 104.

1.1 Elongate Base

Figure 3:
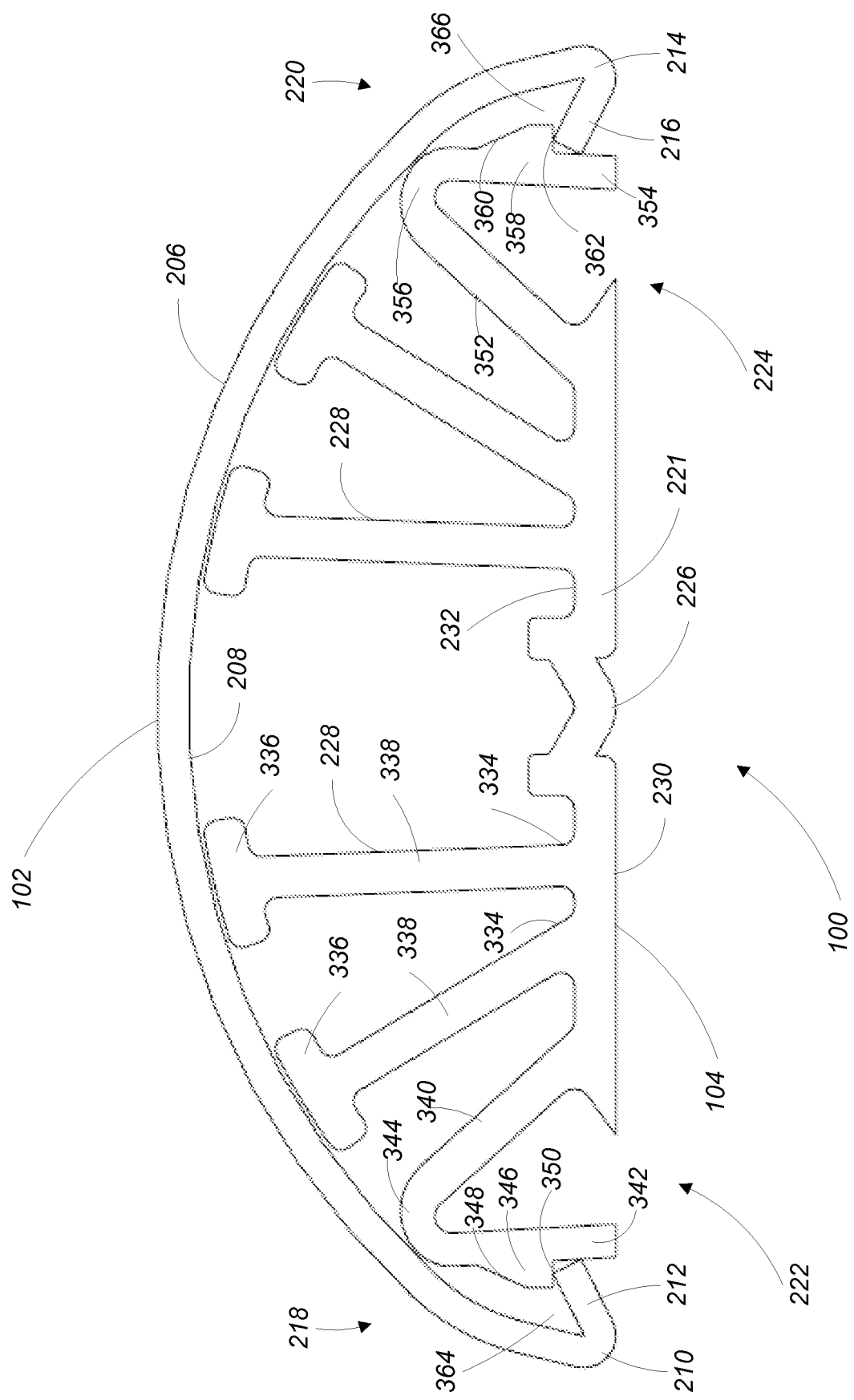
FIG. 3 is a cross-sectional view of the semi-cylindrical bumper assembly of FIG. 1.

Referring to FIG. 3, in a cross-sectional view, each of the support members 228 includes a proximal end 334 attached to the base body 221, a distal end 336, and a shaft 338 extending between the proximal end 334 and the distal end 336. Each of the support members 228 has an angle of extension and a length such that the distal end 336 of each support member 228 lies adjacent to (but not necessarily touching) a different portion of the inner surface 208 of the elongate rigid shell 102 when the bumper assembly 100 is assembled. In some examples, the thickened distal end 336 is angled to ensure that the thickened distal end 336 closely conforms to the shape of the inner surface 208 of the elongate rigid shell 102. In some examples, the thickened distal end 336 includes a flattened surface which is arranged substantially parallel to the inner surface 208 of the elongate rigid shell 102. Taken together, the support members 228 form a support structure which reinforces the elongate rigid shell 102 if it is hit by an object, preventing or minimizing deformation of the metallic material of the elongate rigid shell 102.

The first latching element 222 includes a first base portion 340 extending from the base body 221 and a first cantilever portion 342 extending from a first connection point 344 between the first base portion 340 and the first cantilever portion 342. The first cantilever portion 342 includes, on a side facing away from the base body 221, a first latching protrusion 346 including a first inclined surface 348 and a first shoulder 350.

The second latching element 224, which is a mirror image of the first latching element 222 includes a second base portion 352 extending from the base body 221 and a second cantilever portion 354 extending from a second connection point 356 between the second base portion 352 and the second cantilever portion 354. The second cantilever portion 354 includes, on a side facing away from the base body 221, a second latching protrusion 358 including a second inclined surface 360 and a second shoulder 362.

In operation, the first and second latching elements 222, 224 are designed to flex inward toward the base body 104 when a force is applied to the cantilever portions 342, 354 of the latching elements 222, 224. In some examples, to increase the flexibility of the latching elements 224, 222, (e.g., for ease of installation) the material in the area of the first connection point 344 and the second connection point 356 is made thinner than the material in the base portions 340, 352 and the cantilever portions 342, 354.

1.2 Elongate Rigid Shell

In the example of FIG. 3, the elongate rigid shell 102 has a semi-circular profile which, as is noted above, lies adjacent to the distal ends 336 of the support members 228 when the bumper assembly 100 is assembled. The first flange 212 and the second flange 214 each extend in an inward direction toward the inner surface 208 of the elongate rigid shell 102 at an angle (e.g., a 30° angle or a 26.8° angle) from a plane aligned with the first side 230 of the base body 221).

In general, the first flange 212 and the second flange 214 each have a length sufficient to ensure that they make contact with the first and second latching protrusions 346, 358, respectively, when the elongate rigid shell 102 is assembled onto the elongate base 104.

1.3 Bumper Assembly

To assemble the bumper assembly 100, the elongate base 104 is first attached (e.g., by inserting screws through the attachment portion 226) to a surface such as an outer surface of a product storage fixture (not shown). The elongate rigid shell 102 is then positioned over the elongate base 104 before being lowered onto the elongate base 104 until the elongate rigid shell 102 is securely held on the elongate base 104 by the latching elements 222, 224.

Focusing first on the first latching element 222, as the elongate rigid shell 102 is lowered onto the elongate base 104, the first flange 212 makes contact with the first inclined surface 348 of the first latching protrusion 346. As the elongate rigid shell 102 continues to be lowered onto the elongate base 104, the first flange 212 maintains contact with the first inclined surface 348. Since the first flange 212 is made of a rigid material, and the first latching element 222 is flexible, the first cantilevered portion 342 is deflected inward toward the base body 221 as the first flange 212 moves along the first inclined surface 348.

After the first flange 212 moves past the first inclined surface 348, the first flange 212 moves to a position under the first latching protrusion 346 and engages the first shoulder 350. In some examples, as the first flange 212 moves into the position under the first latching protrusion 346, an outward force exerted on the first flange 212 by the first latching element 222 causes the first cantilever portion 342 to move in a lateral direction away from the base body 221 such that the first latching protrusion 346 moves into a first channel 364 formed between the first flange 212 and the inner surface 208 of the elongate rigid shell 102.

In some examples, when the first latching protrusion 346 is in the first channel 364 with the first flange 212 positioned under the first latching protrusion 346 and engaging the first shoulder 350, the first latching element 222 is still in a flexed state, ensuring that the first latching protrusion 346 remains engaged even if the elongate rigid shell 102 flexes or moves laterally relative to the elongate base 104.

Moving to the second latching element 224, as the elongate rigid shell 102 is lowered onto the elongate base 104, the second flange 216 makes contact with the second inclined surface 360 of the second latching protrusion 358. As the elongate rigid shell 102 continues to be lowered onto the elongate base 104, the second flange 216 maintains contact with the second inclined surface 360. Since the second flange 216 is made of a rigid material, and the second latching element 224 is flexible, the second cantilevered portion 354 is deflected inward toward the base body 221 as the second flange 216 moves along the second inclined surface 360.

After the second flange 216 moves past the second inclined surface 360, the second flange 216 moves to a position under the second latching protrusion 358 and engages the second shoulder 362. In some examples, as the second flange 216 moves into the position under the second latching protrusion 358, an outward force exerted on the second flange 216 by the second latching element 224 causes the second cantilever portion 354 to move in a lateral direction away from the base body 221 such that the second latching protrusion 358 moves into a second channel 366 formed between the second flange 216 and the inner surface 208 of the elongate rigid shell 102.

In some examples, when the second latching protrusion 358 is in the second channel 366 with the second flange 216 positioned under the second latching protrusion 358 and engaging the second shoulder 362, the second latching element 224 is still in a flexed state, ensuring that the second latching protrusion 358 remains engaged even if the elongate rigid shell 102 flexes moves laterally relative to the elongate base 104.

In some examples, to remove the elongate rigid shell 102 from the elongate base 104, a thin, rigid tool (not shown) can be inserted between the first edge 210 or the second edge 214 and the surface on which the bumper assembly 100 is mounted. The tool can then be slid under the elongate rigid shell 102 until it makes contact with the first cantilevered portion 342 or the second cantilevered portion 354. The tool can then push the cantilevered portion 342, 354 in an inward direction toward the base body 221, causing the latching protrusion 346, 358 of the cantilevered portion 342, 354 to disengage from the channel 364, 366. With the latching protrusion 346, 358 disengaged from the channel 364, 366, the elongate rigid shell 102 can be taken off of the elongate base 104.

2 Rectangular Stainless Steel Bumper

Figure 4:
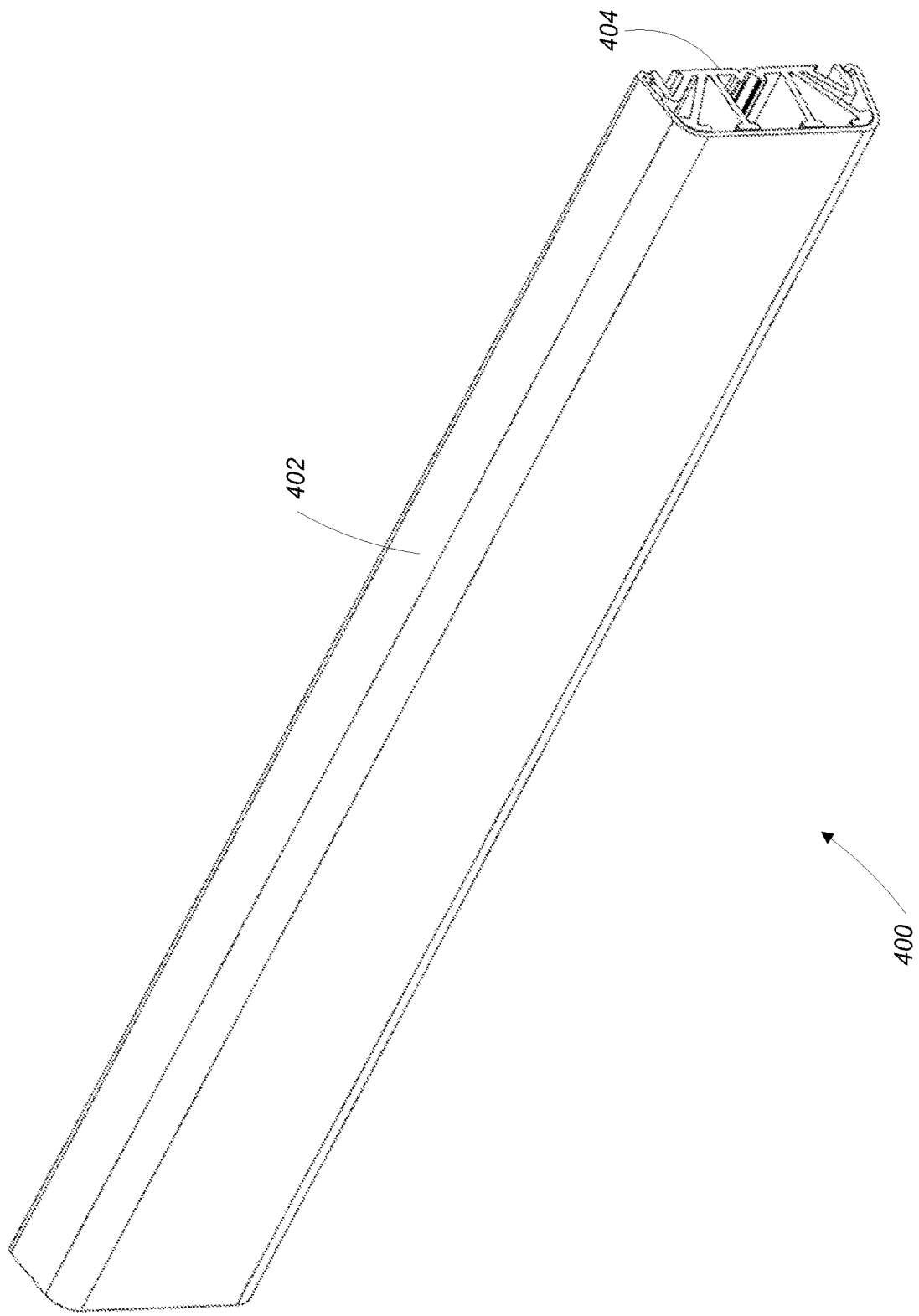
FIG. 4 is a perspective view of a rectangular bumper assembly.
Figure 5:
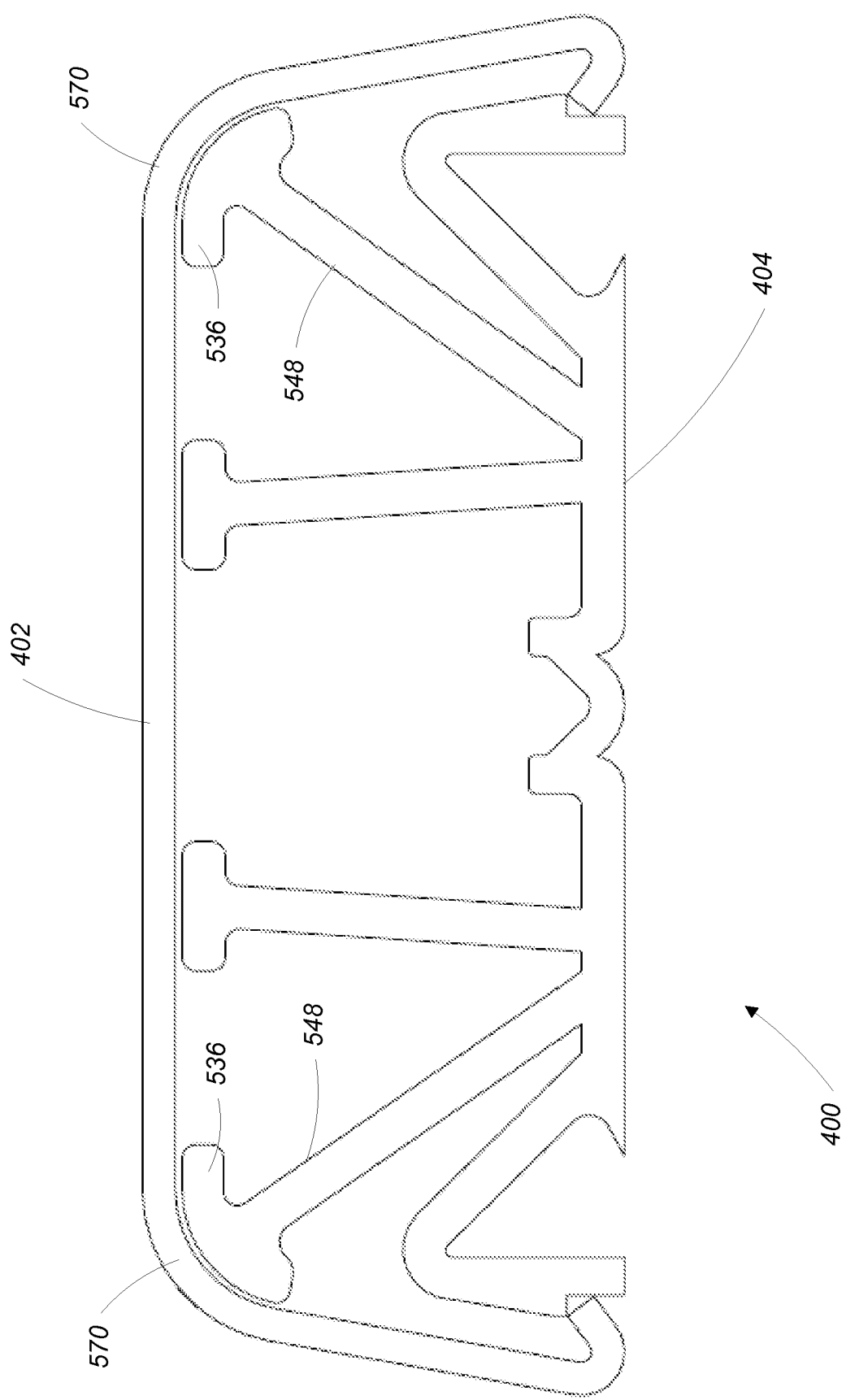
FIG. 5 is cross-sectional view of the rectangular bumper assembly of FIG. 4.

Referring to FIG. 4, in an alternative embodiment, a rectangular stainless steel bumper assembly 400 includes an elongate rigid shell 402 with a substantially rectangular shape and an elongate base 404 with a substantially rectangular shape. Referring to FIG. 5, a cross-sectional view of the rectangular stainless steel bumper assembly 400 more clearly illustrates the substantially rectangular shape of the elongate rigid shell 402 and the elongate base 404.

In some examples, the rectangular stainless steel bumper assembly 400 includes some or all of the features described above for the semi-cylindrical stainless steel bumper assembly (e.g., latching elements, rigid flanges, and support elements). However, the configuration of some of the features differs between the two embodiments. For example, there may be a different number of support elements 548 in the rectangular stainless steel bumper assembly 400 than there are in the semi-cylindrical stainless steel bumper assembly. The support elements 548 may also be arranged differently. For example, in FIG. 5, two of the support elements 548 are arranged such that their distal ends 536 are located in the corners 570 of the rectangular elongate rigid shell 402. Having the distal ends of the support elements 548 arranged in the corners 570 provides support to the rectangular elongate rigid shell 402 in areas where the rectangular elongate rigid shell 402 is most susceptible to deformation. In some examples, the elongate rigid shell 402 is not entirely rectangular, but instead has a trapezoidal shape which serves to prevent debris from accumulating on the outer surface of the elongate rigid shell 402.

3 End Caps

Referring to FIG. 6, in some examples, a first rounded end cap 680 is configured for insertion into an end of any of the bumper assemblies described above for the purpose of making the bumper assembly aesthetically pleasing, reinforcing the end of the bumper assembly, and preventing debris from entering the bumper assembly.

In some examples, the rounded end cap 680 includes a substantially hollow rounded cap portion 682 from which a fastening protrusion 684 extends. The fastening protrusion 684 includes a through hole 686 and one or more engagement members 688. In operation, after fastening the elongate base to a surface and before assembling the elongate rigid shell onto the elongate base, the fastening protrusion 684 of the rounded end cap 680 is inserted into the end of the elongate base such that it is disposed between two of the support elements and lies on or above the attachment portion of the elongate base. In some examples, the engagement members 688 cause the rounded end cap 680 to snap into the elongate base, securing the two elements together, providing a proper alignment between the two elements, and providing feedback to the user that the two elements are properly connected. A fastener (e.g., a screw) is then inserted through the through hole 686 and into the surface, thereby fastening the rounded end cap in place. In some examples, the fastening protrusion 684 has a width greater than the distance between the two support elements that it is disposed between such that the fastening protrusion 684 is held in place by the two support elements.

When the elongate rigid shell is subsequently assembled onto the elongate base, the rounded cap portion 682 is flush with the elongate rigid shell, creating a substantially seamless appearance. The engagement members 688 are located beneath a portion of the end of the elongate rigid shell and serve as an additional support structure for the elongate rigid shell.

Referring to FIG. 7, in some examples, the underside 681 of the rounded cap portion 682 opens into a hollow area and includes one or more reinforcing ribs 690 which serve as a support structure for preventing or mitigating damage to the rounded cap portion 682 due to an object hitting the rounded cap portion 682.

Figure 8:
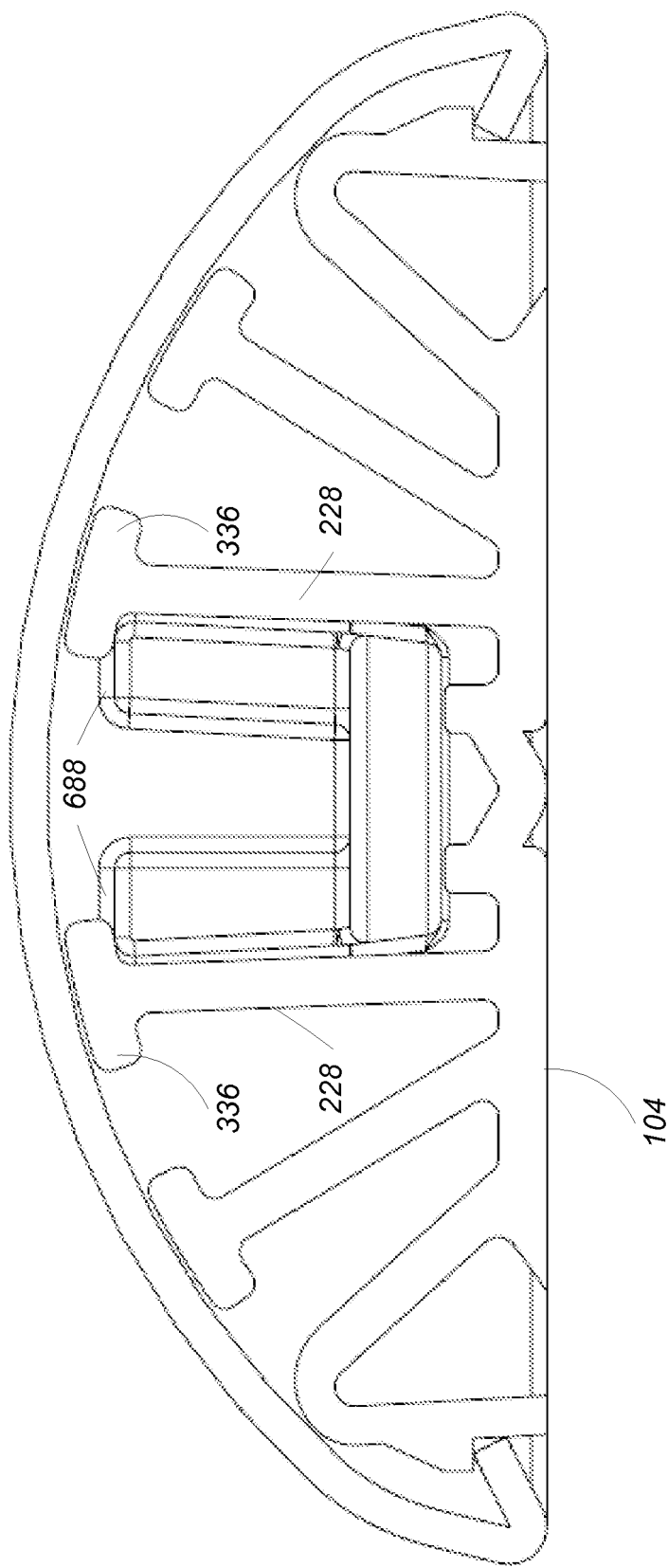
FIG. 8 is a cross-sectional view of an elongate base with a rounded end cap inserted therein.

Referring to FIG. 8, in some examples, when the rounded end cap 680 is inserted into the elongate base 104, the engagement members 688 engage an underside of the distal ends 336 of the support members 228 for the purpose of maintaining the rounded end cap 680 in the elongate base 104.

Figure 9:
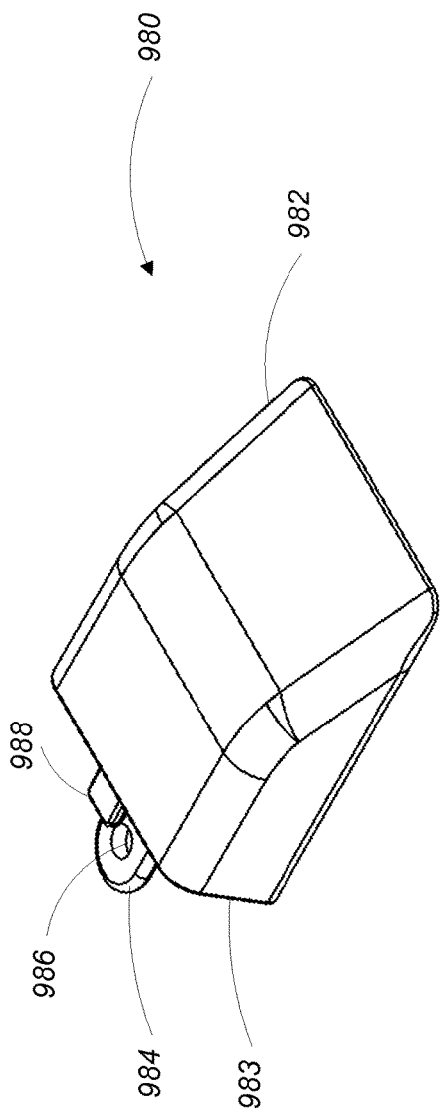
FIG. 9 is a top perspective view of a wedge-shaped end cap.

Referring to FIG. 9, in another embodiment, a wedge-shaped end cap 980 is configured for use with the rectangular bumper assembly for the purpose of making the bumper assembly aesthetically pleasing, reinforcing the end of the bumper assembly, and preventing debris from entering the bumper assembly.

The wedge-shaped end cap 980 includes a substantially hollow, wedge-shaped cap portion 982, a hollow receiving portion 983, a fastening protrusion 984, and an engagement tab 988. The hollow receiving portion 983 is configured to receive a portion of the elongate base of the rectangular bumper assembly. In some examples, the portion of the elongate base can be slid into the hollow receiving portion 983. In other examples, the hollow receiving portion 983 includes flanges 985 (shown in FIG. 10 and similar to the flanges on the elongate rigid shell) and can be assembled onto the portion of the elongate base in the same way that the elongate rigid shell is assembled onto the elongate base.

The fastening protrusion 984 includes a through hole 986. In operation, after fastening the elongate base to a surface and before assembling the elongate rigid shell onto the elongate base, the hollow receiving portion 983 of the wedge-shaped end cap 980 is assembled onto a portion of the elongate base such that it receives the portion of the elongate base with the fastening protrusion 984 disposed between two of the support elements and on or above the attachment portion of the elongate base. In some examples, the engagement tab 988 causes the rounded end cap 980 to snap into the elongate base, securing the two elements together, providing a proper alignment between the two elements, and providing feedback to the user that the two elements are properly connected. A fastener (e.g., a screw) is then inserted through the through hole 986 and into the surface, thereby fastening the end cap in place. In some examples, the fastening protrusion 984 has a width greater than the distance between the two support elements that it is disposed between such that the fastening protrusion 984 is held in place by the two support elements.

When the elongate rigid shell is subsequently assembled onto the elongate base, the hollow receiving portion 983 is flush with the elongate rigid shell, creating a substantially seamless appearance. The engagement tab 988 is located beneath a portion of the end of the elongate rigid shell and serves as an additional support structure for the elongate rigid shell.

Figure 10:
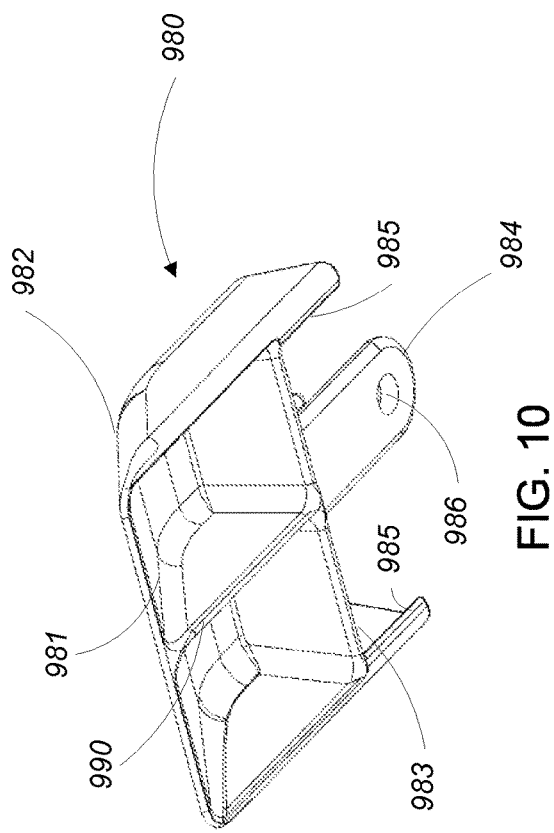
FIG. 10 is a bottom perspective view of the wedge-shaped end cap of FIG. 9.

Referring to FIG. 10, in some examples, the underside 981 of the wedge-shaped cap portion 982 opens into a hollow area and includes one or more reinforcing ribs 990 which serve as a support structure for preventing or mitigating damage to the wedge-shaped cap portion 982 due to an object hitting the wedge-shaped cap portion 982.

Figure 11:
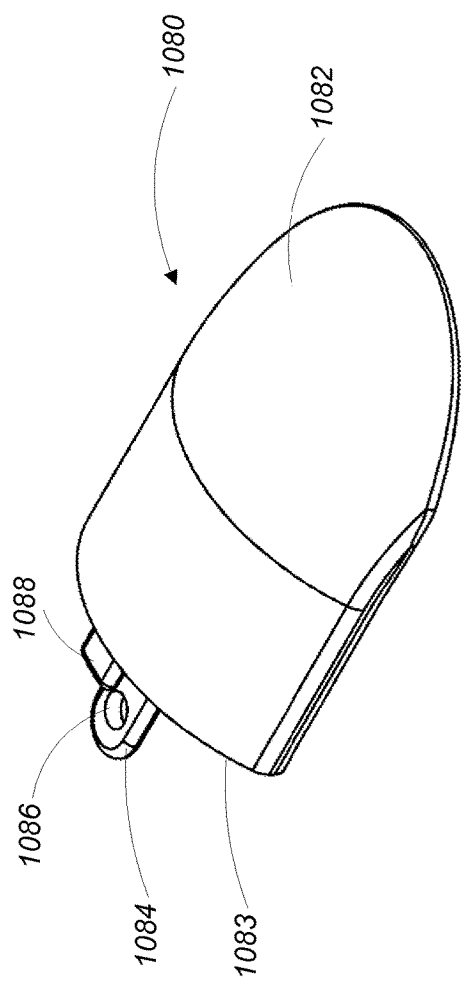
FIG. 11 is a top perspective view of an alternative embodiment of a rounded end cap.

Referring to FIG. 11 in another embodiment, a second rounded end cap 1080 is configured for use with the semi-cylindrical bumper assembly for the purpose of making the bumper assembly aesthetically pleasing, reinforcing the end of the bumper assembly, and preventing debris from entering the bumper assembly.

The rounded end cap 1080 includes a substantially hollow, rounded cap portion 1082, a hollow receiving portion 1083, a fastening protrusion 1084, and an engagement tab 1088. The hollow receiving portion 1083 is configured to receive a portion of the elongate base of the semi-cylindrical bumper assembly. In some examples, the portion of the elongate base can be slid into the hollow receiving portion 1083. In other examples, the hollow receiving portion 1083 includes flanges 1085 (shown in FIG. 12 and similar to the flanges on the elongate rigid shell) and can be assembled onto the portion of the elongate base in the same way that the elongate rigid shell is assembled onto the elongate base.

The fastening protrusion 1084 includes a through hole 1086. In operation, after fastening the elongate base to a surface and before assembling the elongate rigid shell onto the elongate base, the hollow receiving portion 1083 of the rounded end cap 1080 is assembled onto a portion of the elongate base such that it receives the portion of the elongate base with the fastening protrusion 1084 disposed between two of the support elements and on or above the attachment portion of the elongate base. In some examples, the engagement tab 1088 causes the rounded end cap 1080 to snap into the elongate base, securing the two elements together, providing a proper alignment between the two elements, and providing feedback to the user that the two elements are properly connected. A fastener (e.g., a screw) is then inserted through the through hole 1086 and into the surface, thereby fastening the rounded end cap in place. In some examples, the fastening protrusion 1084 has a width greater than the distance between the two support elements that it is disposed between such that the fastening protrusion 1084 is held in place by the two support elements.

When the elongate rigid shell is subsequently assembled onto the elongate base, the hollow receiving portion 1083 is flush with the elongate rigid shell, creating a substantially seamless appearance. The engagement tab 1088 is located beneath a portion of the end of the elongate rigid shell and serves as an additional support structure for the elongate rigid shell.

Figure 12:
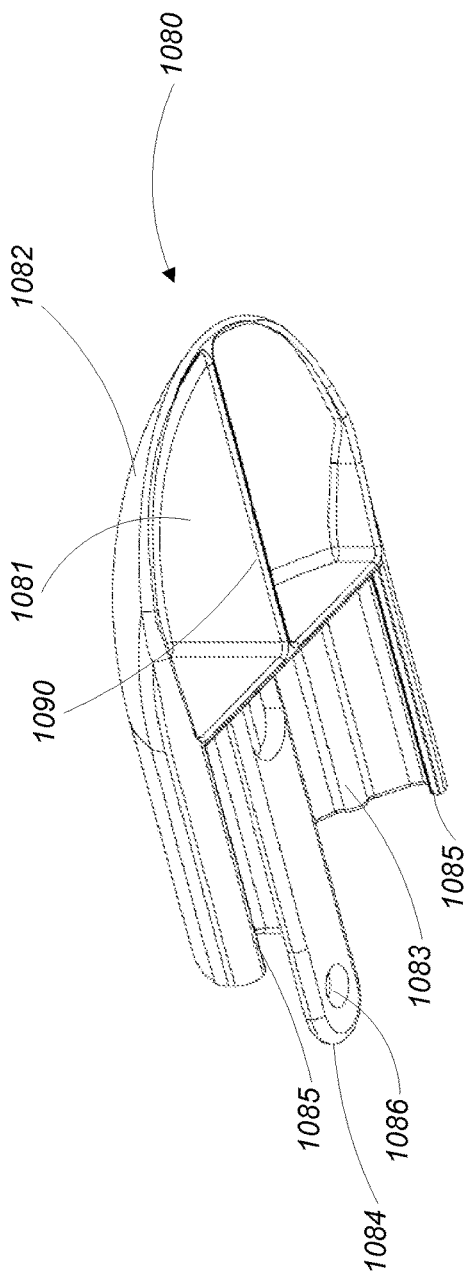
FIG. 12 is a bottom perspective view of the rounded end cap of FIG. 11.

Referring to FIG. 12, in some examples, the underside 1081 of the rounded cap portion 1082 opens into a hollow area and includes one or more reinforcing ribs 1090 which serve as a support structure for preventing or mitigating damage to the rounded cap portion 1082 due to an object hitting the rounded cap portion 1082.

Figure 13:
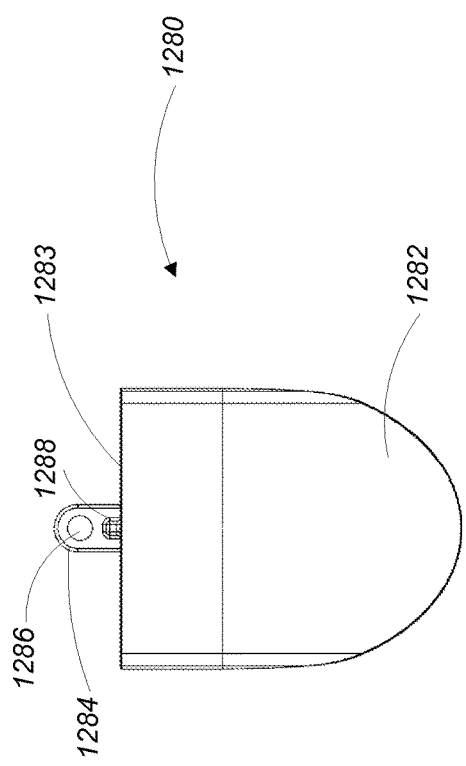
FIG. 13 is a top view of an alternative embodiment of a rounded end cap.

Referring to FIG. 13 in another embodiment, a third rounded end cap 1280 is configured for use with the semi-cylindrical bumper assembly for the purpose of making the bumper assembly aesthetically pleasing, reinforcing the end of the bumper assembly, and preventing debris from entering the bumper assembly.

The rounded end cap 1280 includes a substantially hollow, rounded cap portion 1282, a hollow receiving portion 1283, and a fastening protrusion 1284. The hollow receiving portion 1283 is configured to receive a portion of the elongate base of the semi-cylindrical bumper assembly. In some examples, the portion of the elongate base can be slid into the hollow receiving portion 1283. In other examples, the hollow receiving portion 1283 includes flanges 1285 (shown in FIG. 14 and similar to the flanges on the elongate rigid shell) and can be assembled onto the portion of the elongate base in the same way that the elongate rigid shell is assembled onto the elongate base. In some examples, the hollow receiving portion 1283 is shorter than the hollow receiving portions of other end cap embodiments described herein.

The fastening protrusion 1284 includes a through hole 1286 and an engagement member 1288. In operation, after fastening the elongate base to a surface and before assembling the elongate rigid shell onto the elongate base, the hollow receiving portion 1283 of the rounded end cap 1280 is assembled onto a portion of the elongate base such that it receives the portion of the elongate base with the fastening protrusion 1284 disposed between two of the support elements and on or above the attachment portion of the elongate base. In some examples, the engagement member 1288 causes the rounded end cap 1280 to snap into the elongate base, securing the two elements together, providing a proper alignment between the two elements, and providing feedback to the user that the two elements are properly connected. A fastener (e.g., a screw) is then inserted through the through hole 1286 and into the surface, thereby fastening the rounded end cap in place. In some examples, the fastening protrusion 1284 has a width greater than the distance between the two support elements that it is disposed between such that the fastening protrusion 1284 is held in place by the two support elements.

When the elongate rigid shell is subsequently assembled onto the elongate base, the hollow receiving portion 1283 is flush with the elongate rigid shell, creating a substantially seamless appearance. The engagement member 1288 extends through and out of the hollow receiving portion 1283 and serves as an additional support structure for the elongate rigid shell.

Figure 14:
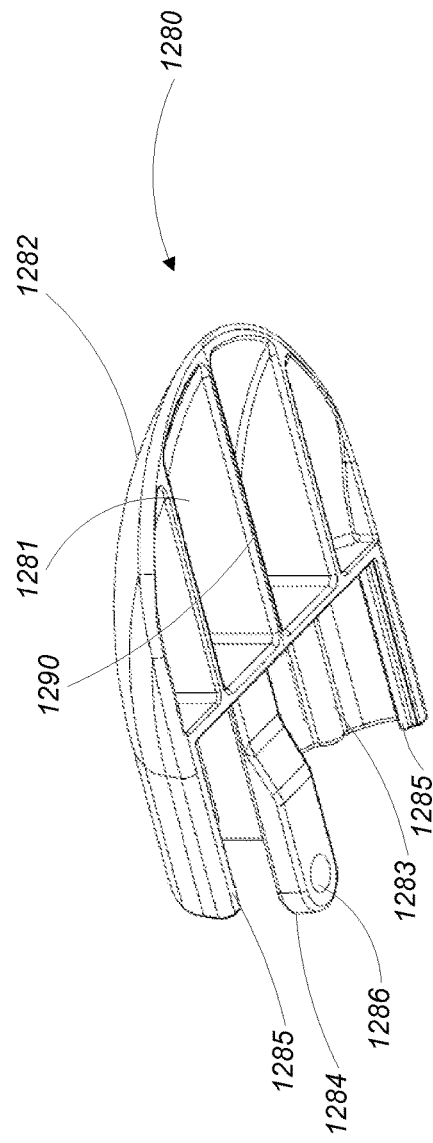
FIG. 14 is a bottom perspective view of the rounded end cap of FIG. 13.

Referring to FIG. 14, in some examples, the underside 1281 of the rounded cap portion 1282 opens into a hollow area and includes one or more reinforcing ribs 1290 which serve as a support structure for preventing or mitigating damage to the rounded cap portion 1282 due to an object hitting the rounded cap portion 1282.

4 Alternatives

The shapes of bumper assemblies are not limited to those described above and can be adapted to any number of applications.

Other types of latching elements can be used in place of the two-part cantilevered latching elements described above. For example, a single piece cantilevered latching element could be used.

Any sufficiently rigid material, and not just stainless steel can be used to form the elongate rigid shell. Any sufficiently flexible material, and not just plastic can be used to form the elongate rigid base.

In some examples, the elongate base and the elongate rigid shell can be formed using an extrusion process. In some examples, the end caps can be formed using a casting, injection molding, or a roll-molding process. In some examples, the end caps are made of the same material as the elongate rigid shell. In some examples, the end caps are made of the same material as the elongate base. In some examples, a portion of the end caps are made from the same material as the elongate rigid shell and other portions of the end caps are made from the same material as the elongate base.

In some examples, an inner surface of the hollow receiving portions includes one or more ribs separated by channels configured to receive the distal ends of the support members.

In some examples, only one edge of the elongate base includes a latching element and only one edge of the elongate rigid shell includes a flange.

In some examples, the latching elements, the flanges, and/or the support elements are discontinuous.

In some examples, the bumper assembly includes corner caps such that the bumper assembly can be installed on surfaces that include corners. In some examples, the corner caps include features similar to the features of the elongate rigid shell, and are configured to engage the latching elements of the elongate base in the same manner that the elongate rigid shell engages the latching elements.

It is to be understood that the foregoing description is intended to illustrate and not to limit the scope of the invention, which is defined by the scope of the appended claims. Other embodiments are within the scope of the following claims.

What is claimed is:

1. A bumper assembly comprising:
    an elongate rigid shell formed of a metallic material and having a first degree of rigidity, the shell including
        an inner surface;
        an outer surface;
        a first shell edge; and
        a first flange protruding from the first shell edge in a direction toward the inner surface of the elongate rigid shell;
    an elongate base including
        a base body including a first base edge;
        a first flexible latching element extending from the first base edge of the base body, the first flexible latching element including a first latching protrusion having a first inclined outer surface and a first shoulder, the first flexible latching element having a second degree of rigidity less than the first degree of rigidity; and a plurality of support members extending from the base body, each support member including
- a proximal end attached to the base body,
- a distal end including a contact portion for substantially preventing deformation of the elongate rigid shell, the contact portion configured to lie adjacent to the elongate rigid shell when the elongate base is inserted into the elongate rigid shell, and
- a shaft extending between the proximal end and the distal end,
- wherein the contact portion has a width greater than a width of the shaft;

wherein the elongate base is configured for insertion into the elongate rigid shell with the first flange causing deflection of the first flexible latching element and engaging the first shoulder of the first latching protrusion.

2. The bumper assembly of claim 1 wherein the first flexible latching element includes a first portion extending from the base body and a cantilever portion extending from the first portion, wherein the shoulder and the latching protrusion are disposed on the cantilever portion.

3. The bumper assembly of claim 2 wherein a thickness of the flexible latching element at a point on the flexible latching element where the first portion and the cantilever portion connect is reduced to increase a flexibility of the flexible latching element.

4. The bumper assembly of claim 1 wherein the outer surface of the elongate rigid shell has a substantially semi-cylindrical shape.

5. The bumper assembly of claim 1 wherein a cross section of the outer surface of the elongate rigid shell has a substantially trapezoidal shape.

6. The bumper assembly of claim 1 wherein a cross section of the outer surface of the elongate rigid shell has a substantially rectangular shape.

7. The bumper assembly of claim 1 wherein the elongate rigid shell is made of stainless steel.

8. The bumper assembly of claim 1 wherein
the elongate rigid shell further includes
- a second shell edge, and
- a second flange protruding from the second shell edge in a direction toward the inner surface of the elongate rigid shell, and the elongate base further includes
- a second base edge, and
- a second flexible latching element extending from the second base edge of the base body, the second flexible latching element including a second latching protrusion having a second inclined outer surface and a second shoulder, the second flexible latching element having the second degree of rigidity, wherein the elongate base is further configured for insertion into the elongate rigid shell with the second flange causing deflection of the second flexible latching element and engaging the second shoulder of the second latching protrusion.

9. The bumper assembly of claim 1 wherein a first contact portion of a first support member of the plurality of support members is disposed at a first angle relative to the base body and a second contact portion of a second support member of the plurality of support members is disposed at a second angle, different from the first angle, relative to the base body.

10. The bumper assembly of claim 1 wherein the contact portion of each support member of the plurality of support members is disposed at a different angle relative to the base body than the contact portions of the other support members of the plurality of support members.

11. The bumper assembly of claim 1 wherein the contact portion of each support member of the plurality of support members includes a substantially flat surface arranged substantially parallel to an adjacent section of the elongate rigid shell when the elongate base is inserted into the elongate rigid shell.

12. The bumper assembly of claim 1 wherein the elongate rigid shell and the elongate base are movable between a disassembled state with the elongate base fully removed from the elongate rigid shell and an assembled state with the elongate base fully inserted into the elongate rigid shell, wherein movement of the elongate rigid shell and the elongate base from the disassembled state to the assembled state causes the deflection of the first flexible latching element by the first flange.

13. The bumper assembly of claim 12 wherein the first flange maintains the flexible latching element in a deflected state when the elongate rigid shell and the elongate base are in the assembled state.

14. The bumper assembly of claim 1 wherein the first flexible latching element is formed from an elastic material and the metallic material of the elongate rigid shell is inelastic.

15. The bumper assembly of claim 1 wherein the first flexible latching element is formed from a resilient material and the metallic material of the elongate rigid shell is permanently deformable.

16. A bumper assembly comprising:
an elongate rigid shell formed of a metallic material and having a first degree of rigidity, the shell including
- an inner surface;
- an outer surface;
- a first shell edge; and
- a first flange protruding from the first shell edge in a direction toward the inner surface of the elongate rigid shell;

an elongate base including
- a base body including a first base edge; and
- a first flexible latching element extending from the first base edge of the base body, the first flexible latching element including a first latching protrusion having a first inclined outer surface and a first shoulder, the first flexible latching element having a second degree of rigidity less than the first degree of rigidity; and
- plurality of support members extending from the base body, each support member having a proximal end attached to the base body and a distal end configured to lie adjacent to the elongate rigid shell when the elongate base is inserted into the elongate rigid shell; and an end cap configured to engage an end of the elongate base, the end cap including a hollow portion, a fastening protrusion for insertion into the elongate base between two support members of the plurality of support members and attachment to the elongate base, and one or more engagement members extending from the fastening protrusion, each engagement member of the one or more engagement members configured to engage a corresponding distal end of one or both of the two support members.

17. The bumper assembly of claim 16 wherein the hollow portion has a rounded shape.

18. The bumper assembly of claim 16 wherein the hollow portion is substantially wedge-shaped.

19. The bumper assembly of claim 16 wherein the hollow portion includes one or more reinforcing ribs.

20. The bumper assembly of claim 16 wherein the hollow portion is configured to abut the end of the elongate base.

21. The bumper assembly of claim 16 wherein the end cap further includes a receiving portion configured to receive a portion of the end of the elongate base.

22. The bumper assembly of claim 16 wherein the end is formed of a metallic material.

23. The bumper assembly of claim 16 wherein the end cap is formed of a plastic material.

24. The bumper assembly of claim 16 wherein the end cap is formed of both a metallic material and a plastic material.

25. The bumper assembly of claim 16 wherein the fastening protrusion includes a through hole configured to receive a fastener for fastening the end cap to the elongate base.

26. The bumper assembly of claim 16 wherein the one or more engagement members are configured to engage the two support members to secure and align the end cap on the elongate base.

\* \* \* \* \*